United States Patent
Graffin

(10) Patent No.: US 7,717,396 B2
(45) Date of Patent: May 18, 2010

(54) MAGNETIC ACTUATOR DEVICE

(75) Inventor: André Graffin, Winfield, IL (US)

(73) Assignee: Serac Group, La Ferte Bernard (FR)

( * ) Notice: Subject to any disclaimer, the term of this patent is extended or adjusted under 35 U.S.C. 154(b) by 0 days.

(21) Appl. No.: 12/073,021

(22) Filed: Feb. 28, 2008

(65) Prior Publication Data
US 2008/0211323 A1    Sep. 4, 2008

(30) Foreign Application Priority Data
Mar. 2, 2007   (FR) .................... 07 01556

(51) Int. Cl.
F16K 31/08   (2006.01)
(52) U.S. Cl. ...................................... 251/65
(58) Field of Classification Search ............ 310/23, 310/87, 12.04, 12.24; 251/65, 62, 63.5
See application file for complete search history.

(56) References Cited

U.S. PATENT DOCUMENTS

| | | | | |
|---|---|---|---|---|
| 3,836,286 A * | 9/1974 | Malaval | ........................ | 417/50 |
| 4,452,423 A * | 6/1984 | Beblavi et al. | ................. | 251/65 |
| 4,831,292 A * | 5/1989 | Berry | ........................... | 310/15 |
| 5,450,877 A * | 9/1995 | Graffin | .................. | 137/630.14 |
| 5,676,344 A * | 10/1997 | Graffin | ......................... | 251/65 |
| 5,816,456 A * | 10/1998 | Graffin | ......................... | 222/559 |
| 6,375,050 B1* | 4/2002 | Gruson | ......................... | 222/504 |
| 6,810,931 B2* | 11/2004 | Graffin | ......................... | 141/301 |
| 7,455,075 B2* | 11/2008 | Xu et al. | .................. | 137/627.5 |
| 2003/0196721 A1* | 10/2003 | Graffin | ......................... | 141/302 |

FOREIGN PATENT DOCUMENTS

FR   2 736 412 A1   1/1997
FR   2 879 339 A1   6/2006

* cited by examiner

Primary Examiner—Burton Mullins
(74) Attorney, Agent, or Firm—Muncy, Geissler, Olds & Lowe, PLLC

(57) ABSTRACT

The magnetic actuator device of the invention comprises a magnetic field generator external to the duct and a permanent magnetic field generator internal to the duct, separated from the magnetic field generator external to the duct by a non-magnetic separator wall, and connected to a moving member, the permanent magnetic field generator internal to the duct being dimensioned to have a face spaced apart from the separator wall so as to define a space that can receive particles of metal without the actuator device jamming.

3 Claims, 2 Drawing Sheets

MAGNETIC ACTUATOR DEVICE

The present invention relates to a magnetic actuator device for actuating a moving member in a duct in which there flows a fluid that contains particles of metal.

BACKGROUND OF THE INVENTION

A magnetic actuator device for actuating a moving member in a duct is known, in particular from document FR-A-2 879 339, the actuator device comprising a magnetic field generator external to the duct and a permanent magnetic field generator internal to the duct, separated from the external magnetic field generator by a non-magnetic separator wall, and connected to the moving member. In known magnetic actuator devices, the permanent magnetic field generator internal to the duct is mounted to slide with small clearance relative to the facing separator wall. When the fluid for packaging contains particles of metal, as occurs with sugar-or chocolate-containing fluids manufactured from solid ingredients that have been subjected to grinding while being prepared, the particles are attracted by the magnetic field and they thus come to press against the separator wall in register with the internal magnetic field generator and on the face of the internal permanent magnetic field generator that faces towards said wall. During the reciprocating displacements of the permanent magnetic field generator internal to the duct, friction between the particles and the wall runs the risk of creating wear and also of blocking the moving member when the metal particles accumulate and are jammed between the permanent magnetic field generator internal to the duct and the facing wall.

OBJECT OF THE INVENTION

An object of the invention is to propose a magnetic actuator device for actuating a moving member that is less sensitive than prior devices to the presence of metal particles in the fluid flowing in the duct.

SUMMARY OF THE INVENTION

In order to achieve this object, the invention provides a magnetic actuator device for actuating a moving member in a duct, the actuator device comprising a magnetic field generator external to the duct and a permanent magnetic field generator internal to the duct, separated from the external magnetic field generator by a non-magnetic separator wall, and connected to the moving member, the permanent magnetic field generator internal to the duct having a face that is spaced apart from the separator wall, and being carried by a non-magnetic guide member having guide portions adjacent to the separator wall beyond the ends of the permanent magnetic field generator internal to the duct relative to a direction of a generated magnetic field.

As a result, instead of being retained at the interface of small size between the guide portions and the separator wall, the particles are entrained by the fluid into the zone where the magnetic field is the most intense, in which the face of the permanent magnetic field generator internal to the duct is spaced apart from the separator wall so that the metal particles can be deposited without leading to friction against the separator wall.

In an advantageous version of the invention, the guide portions are separated by a distance that is not less than the sum of a stroke of the permanent magnetic field generator internal to the duct plus a length of the permanent magnetic field generator internal to the duct taken in a travel direction of the permanent magnetic field generator internal to the duct. Thus, metal particles are deposited only inside a volume that is not swept at any time by the guide portions.

BRIEF DESCRIPTION OF THE DRAWINGS

Other characteristics and advantages of the invention appear further on reading the following description of two particular, non-limiting, embodiments of the invention given with reference to the accompanying figures, in which.

DETAILED DESCRIPTION OF THE INVENTION

Figure 1:
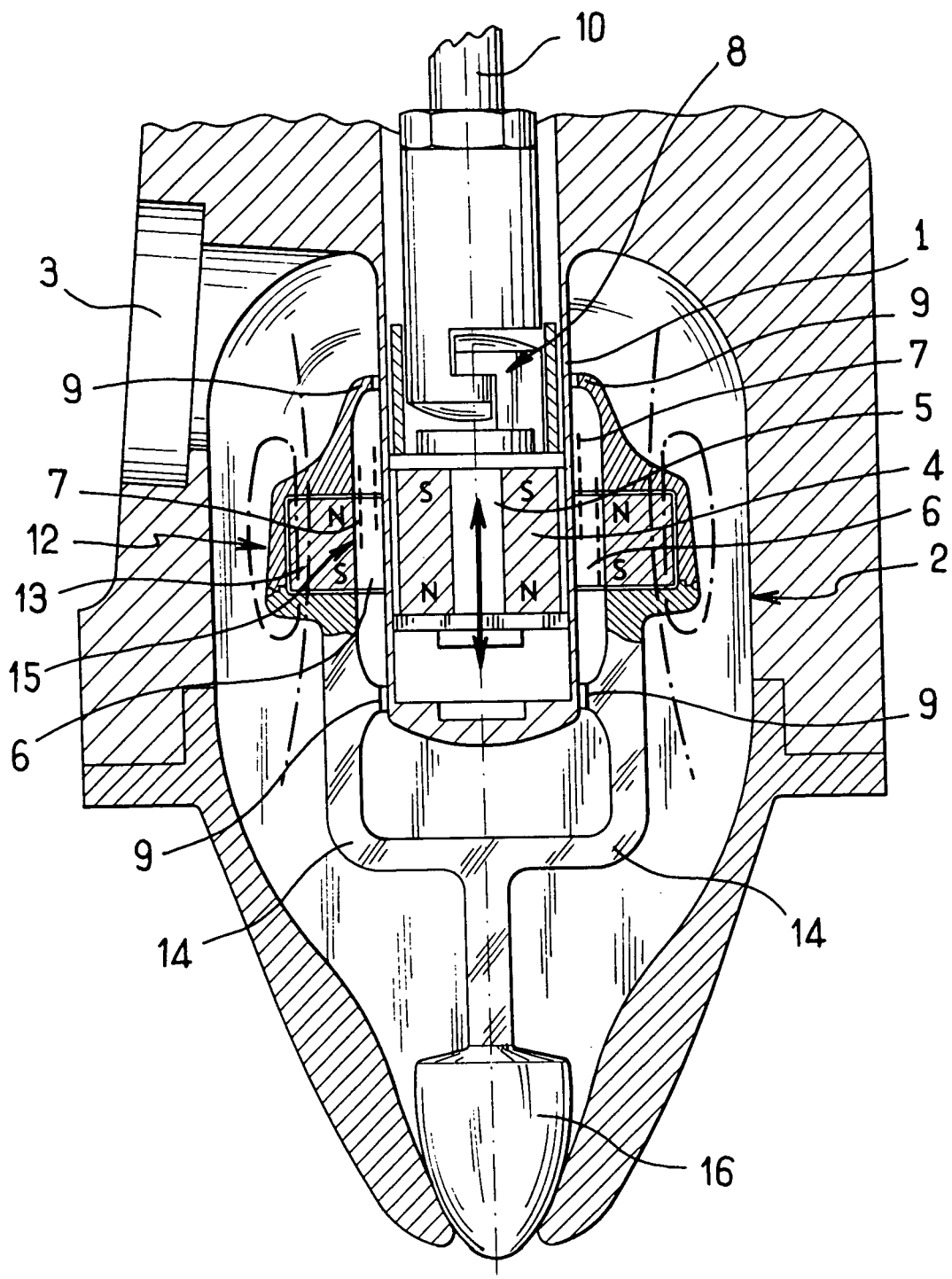
FIG. 1 is a fragmentary axial section view of a filler spout fitted with an actuator device constituting a first embodiment of the invention.

With reference to FIG. 1, the actuator device shown comprises, in a manner that is itself known from the above-mentioned document, an elongate non-magnetic envelope 1 in the form of a glove finger that is fastened to the inside of the body of a filler spout forming a duct 2 for a fluid for packaging that is introduced into the duct 2 via a feed opening 3.

The actuator device also has a magnetic field generator 4 mounted to slide in the non-magnetic envelope 1. Although it is shown inside the non-magnetic envelope 1, the magnetic field generator 4 is thus external to the duct 2 with the non-magnetic envelope 1 forming one of its walls. In the embodiment shown, the magnetic field generator 4 comprises an annular magnet made up of a stack of magnetized washers mounted on a support rod 5 and generating axial magnetic flux inside the non-magnetic envelope 1. The support rod 5 is connected via a coupling member given overall reference 8 to a control rod 10.

Furthermore, still in known manner, the actuator device has a coupling ring 12 of non-magnetic material surrounding the non-magnetic envelope 1 and within which there is fitted a permanent magnetic field generator 13 that is internal to the duct 2 and that generates magnetic flux parallel to the magnetic flux generated by the external field generator 4. The non-magnetic envelope 1 thus forms a separator wall between the permanent magnetic field generator internal to the duct and the external magnetic field generator. The coupling ring 12 is connected via connection arms 14 to a moving member 16, in this case a valve member of the filler spout to which the invention is applied.

According to the invention, the inside face 15 of the internal permanent magnetic field generator 13 is spaced apart from the separator wall 1 so as to define an annular space 6 that is sufficient to receive particles 7 of metal that are attracted by the magnetic field of the magnetic field generators, without the particles 7 rubbing against one another during the movements of the coupling ring 12 relative to the non-magnetic envelope 1. In order to guide the coupling ring 12, the non-magnetic portion thereof has guide portions 9 adjacent to the separator wall 1 beyond the ends of the permanent magnetic field generator 13 internal to the duct, and with reference to a direction of the magnetic field that is generated. Preferably, as shown in FIG. 1, the guide portions 9 are separated by a distance that is greater than the sum of the stroke of the permanent magnetic field generator internal to the duct plus the length of the permanent magnetic field generator 13 internal to the duct, taken in the travel direction thereof.

Figure 2:
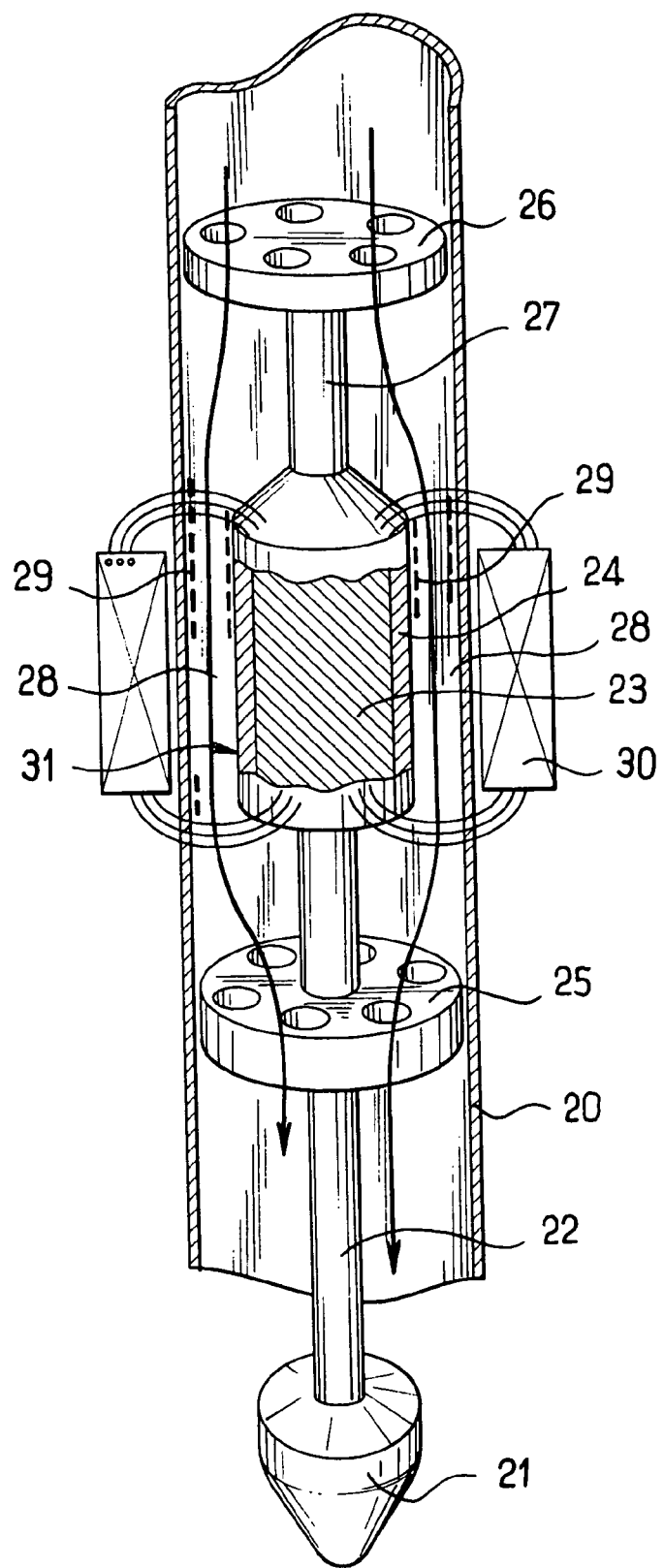
FIG. 2 is a view analogous to the view of FIG. 1 for a second embodiment of the invention.

With reference to FIG. 2, in the second embodiment of the invention, the actuator device is associated with a non-magnetic cylindrical duct 20 in which there is mounted a value member 21 connected by an actuator rod 22 to a permanent magnetic field generator 23 internal to the duct 22, in this case a cylindrical magnetic bar carried by a cylindrical part 24 of non-magnetic material.

The actuator device also includes a magnetic field generator 30 external to the duct 20, in this case a coil connected (in a manner not shown) to an electronic control device for the actuator device.

The permanent magnetic field generator 23 is centered in the duct 20 by a non-magnetic guide washer 25 fastened on the rod 22 at a distance from the bottom end of the magnetized bar 23, and by a non-magnetic guide washer 26 connected to the envelope 24 by a connection rod 27. The guide washers 25 and 26 are pierced by openings 28 allowing the fluid for packaging to flow through. The outside diameter of the envelope 24 is less than the inside diameter of the duct 20 so as to leave between them a space 28 in which particles 29 of metal can accumulate without impeding the movements of the actuator member that is movable inside the duct. For this purpose, the washers 25 and 26 are mounted spaced apart from each other by a distance that is not less than the sum of the stroke plus the length of the magnetic bar 23.

Naturally, the invention is not limited to the embodiments described and variant embodiments can be applied thereto without going beyond the ambit of the invention as defined by the claims.

In particular, although the invention is described more particularly for actuating a valve member in a filler spout, the actuator device of the invention can also be used to actuate a member for regulating flow rate or any other moving member within a duct.

Although the invention is described with guide portions that are separated by a distance that is not less than the sum of the stroke plus the length of the permanent magnetic field generator internal to the duct, it is possible to make the actuator device of the invention with guide portions that are closer together. Under such circumstances, it is desirable to limit the contact area between the guide portions and the duct so that the guide portions can push away the metal particles by separating them from the separator wall so that the magnetic particles tend to become applied against the permanent magnetic field generator internal to the duct and as a result are kept away from the separator wall.

What is claimed is:

1. A magnetic actuator device for actuating a moving member in a duct, the actuator device comprising a magnetic field generator external to the duct and a permanent magnetic field generator internal to the duct, separated from the external magnetic field generator by a non-magnetic separator wall, and connected to the moving member, wherein the permanent magnetic field generator internal to the duct has a face that is spaced apart from the separator wall forming an annular space, and wherein the permanent magnetic field generator internal to the duct is carried by a non-magnetic guide member having guide portions adjacent to the separator wall beyond the ends of the permanent magnetic field generator internal to the duct relative to a direction of a generated magnetic field.

2. An actuator device according to claim 1, wherein the guide portions are separated by a distance that is not less than the sum of a stroke of the permanent magnetic field generator internal to the duct plus a length of the permanent magnetic field generator internal to the duct taken along a displacement direction thereof.

3. An actuator device according to claim 1, wherein the annular space receives particles of metal attracted by the generated magnetic field, without the particles rubbing together.

* * * * *